United States Patent [19]

Millet

[11] 4,425,471

[45] Jan. 10, 1984

[54] NOVEL CYANOACRYLATE ADHESIVE COMPOSITIONS AND METHODS OF BONDING

[75] Inventor: George H. Millet, Oakdale, Minn.

[73] Assignee: Minnesota Mining & Manufacturing Company, St. Paul, Minn.

[21] Appl. No.: 256,860

[22] Filed: Apr. 23, 1981

[51] Int. Cl.$^3$ ............................................. C08F 236/12
[52] U.S. Cl. ................................. 526/298; 156/331.8; 526/75; 560/172
[58] Field of Search .................. 156/331.8, DIG. 113; 526/298

[56] References Cited

U.S. PATENT DOCUMENTS

| | | | |
|---|---|---|---|
| 2,579,008 | 12/1951 | Naps | 526/298 |
| 3,316,227 | 4/1967 | Gerber | 526/298 |
| 3,554,990 | 1/1971 | Quinn | 526/298 |
| 3,701,758 | 10/1972 | Maska | 526/298 |
| 4,170,585 | 10/1979 | Motegi | 526/298 |

FOREIGN PATENT DOCUMENTS

| | | | |
|---|---|---|---|
| 1374464 | 11/1974 | United Kingdom | 526/298 |
| 1415102 | 11/1975 | United Kingdom | 526/298 |
| 405873 | 11/1973 | U.S.S.R. | 526/298 |
| 446198 | 8/1977 | U.S.S.R. | 526/298 |
| 438260 | 9/1977 | U.S.S.R. | 526/298 |

OTHER PUBLICATIONS

European Patent Application 002665, Apr. 8, 1981.

Primary Examiner—C. A. Henderson
Attorney, Agent, or Firm—Donald M. Sell; James A. Smith; Robert W. Sprague

[57] ABSTRACT

A cyanoacrylate adhesive composition comprising an alpha-cyanoacrylate and an alkyl 2-cyanopenta-2,4-dienoate. These composition exhibit improved resistance to heat, water and water vapor as compared to alpha-cyanoacrylates themselves and exhibit suitable peel and impact strengths. Methods of bonding substrates using these compositions are also described.

4 Claims, No Drawings

NOVEL CYANOACRYLATE ADHESIVE COMPOSITIONS AND METHODS OF BONDING

BACKGROUND OF THE INVENTION

This invention relates to novel adhesive compositions.

Alpha-cyanoacrylates are known to be useful in bonding operations involving a variety of substrates. Alpha-cyanoacrylates are generally convenient to use as adhesives since they polymerize rapidly (e.g., often setting within about 30 seconds) at room temperature when exposed to the small amounts of moisture typically found on the surfaces of the substrates being bonded.

Unfortunately, alpha-cyanoacrylates have their limitations. For example, alpha-cyanoacrylates, once cured, may exhibit decreased performance when exposed to water or humid environments. Also, alpha-cyanoacrylates may exhibit poor heat resistance and may provide inadequate peel and impact strengths.

The shortcomings of alpha-cyanoacrylates as adhesives have been recognized in the prior art and there have been efforts in developing new monomers for use as adhesives. U.S. Pat. No. 3,316,227 (Gerber), for example, discloses alkyl 2-cyanopenta-2,4-dienoates which are said to be useful as adhesives. These monomers, however, polymerize slowly at room temperature (e.g., often requiring an hour or more for suitable cure) and, therefore, are not useful by themselves as rapid-curing adhesives. Furthermore, these monomers are solids at room temperature, thereby rendering them impractical to handle in most adhesive applications.

U.S. Pat. No. 3,554,900 (Quinn et al.) discloses alkenyl and alkoxyalkyl esters of 2-cyanopenta-2,4-dienoic acid which, when employed either alone or in combination with alpha-cyanoacrylates, exhibit improved impact strengths upon curing. Unfortunately, as with the above-mentioned alkyl 2-cyanopenta-2,4-dienoate adhesives, these monomers also generally polymerize slowly at room temperature.

United Kingdom Pat. No. 1,415,102 (Trofimov et al.) discloses adhesive compositions comprising an alpha-cyanoacrylate and a bis-ester of 2-cyanopenta-2,4-dienoic acid. These compositions are said to exhibit improved heat resistance due to the presence of the latter bifunctional compound which provides for crosslinking of the polymer network.

BRIEF SUMMARY OF THE PRESENT INVENTION

The present invention provides novel adhesive compositions comprising (a) an alpha-cyanoacrylate; and (b) an alkyl 2-cyanopenta-2,4-dienoate.

The adhesive compositions for the present invention cure rapidly to form strong bonds between a variety of substrates (e.g., steel, aluminum, plastics, glass, and rubber). These compositions, once cured, generally exhibit improved resistance to heat, water and water vapor and exhibit suitable peel and impact strengths. These compositions are particularly suitable for use in environments in which contact with water or water vapor is anticipated.

DETAILED DESCRIPTION OF THE PRESENT INVENTION

The adhesive compositions of the present invention comprise 100 parts by weight of an alpha-cyanoacrylate (a) of the formula $$CH_2=C(CN)-COOR$$

wherein R is an alkyl group of 1-10 carbons or an alkenyl group of 2-10 carbons. Illustrative of the alkyl groups which R may represent are methyl, ethyl, n-propyl, isopropyl, n-butyl, and isobutyl radicals. Illustrative of the alkenyl groups which R may represent are vinyl and allyl radicals.

Suitable alpha-cyanoacrylates of the above formula for employment in the compositions of the present invention include those described in U.S. Pat. No. 3,465,027 (Hawkins et al.), incorporated herein by reference. Preferred alpha-cyanoacrylates for employment in these compositions are ethyl cyanoacrylate and n-butyl cyanoacrylate.

The adhesive compositions of the present invention may comprise a single alpha-cyanoacrylate or may comprise a blend of two or more different alpha-cyanoacrylates.

The compositions of the present invention comprise about 5 to 150 parts by weight, preferably about 5 to 80 parts by weight, more preferably about 15 to 65 parts by weight, and most preferably about 15 to 35 parts by weight of an alkyl 2-cyanopenta-2,4-dienoate (b) of the formula $$CH_2=C(H)-C(H)=C(CN)-COOR$$

wherein R is an alkyl group of 1-10 carbons per 100 parts by weight of the alpha-cyanoacrylate (a). Illustrative of the hydrocarbon groups which R may represent are methyl, ethyl, n-propyl, isopropyl, n-butyl and isobutyl radicals.

Suitable alkyl 2-cyanopenta-2,4-dienoates for employment in the compositions of the present invention include those described in U.S. Pat. No. 3,316,227 (Gerber), incorporated herein by reference. A suitable method for preparation of alkyl 2-cyanopenta-2,4-dienoates is also disclosed in said U.S. Pat. No. 3,316,227. Examples of suitable alkyl 2-cyanopenta-2,4-dienoates for employment in the compositions of the present invention are methyl 2-cyanopenta-2,4-dienoate and ethyl 2-cyanopenta-2,4-dienoate. The preferred alkyl 2-cyanopenta-2,4-dienoate is methyl 2-cyanopenta-2,4-dienoate.

The adhesive compositions of the present invention may comprise a single alkyl 2-cyanopenta-2,4-dienoate or may comprise a blend of two or more alkyl 2-cyanopenta-2,4-dienoates.

As indicated above, the preferred compositions of the present invention comprise either ethyl cyanoacrylate or n-butyl cyanoacrylate as the alpha-cyanoacrylate (a) and methyl 2-cyanopenta-2,4-dienoate as the alkyl 2-cyanopenta-2,4-dienoate (b). While not wishing to be limited by any theory, it is thought that the desirable properties exhibited by the adhesive compositions of the present invention are attributable to copolymerization of the alpha-cyanoacrylate and the alkyl 2-cyanopenta-2,4-dienoate. The more divergent the homopolymerization rates of the alpha-cyanoacrylate and the alkyl 2-cyanopenta-2,4-dienoate, the less likely that there will be any substantial degree of copolymerization of the two monomers and the less significant is the improvement in properties exhibited by these compositions. The above-mentioned combinations of ethyl cyanoacrylate and methyl 2-cyanopenta-2,4-dienoate or n-butyl cyanoacrylate and methyl 2-cyanopenta-2,4-dienoate result in a substantial amount of copolymerization and optimum results are obtained with these combinations. Also, these particular combinations of monomers are preferred since the resultant adhesive compositions exhibit a rapid rate of cure.

The adhesive compositions of the present invention can be modified by the incorporation of fillers, thickeners, pigments, dyes, radical inhibitors, anionic polymerization stabilizers and other modifiers which are well-known in the art. In the event a toughened composition is desired, conventional tougheners such as "Blendex 436" (a methacrylate-butadiene-styrene terpolymer commercially available from Borg-Warner) may be employed in these compositions.

When it is desired to bond substrates, a composition of the present invention is simply applied to the surface of one of the substrates to be bonded. The other substrate is thereupon placed over the composition and the first substrate. The substrates and adhesive composition are maintained in contact until the composition has polymerized to form a bond between the substrates. While cure of the adhesive compositions of the present invention is preferably conducted at ambient temperature, cure may be conducted at elevated temperatures (e.g., up to about 150° F.).

The following non-limiting examples will illustrate the practice of the invention. Unless otherwise indicated, all parts, proportions and percentages are by weight.

TEST METHODS

Preparation of Samples

Approximately 2 to 3 drops (about 0.01 or 0.02 grams) of a composition are applied to a 4"×1"×0.032" (10.2 cm×2.5 cm×0.08 cm) steel coupon which in turn is brought into contact with a second like coupon such that the area of adhesive bonding between the two coupons measures 0.5 inch$^2$ (3.2 cm$^2$). The coupons have previously been abraded with 220 grit sandpaper and wiped with acetone. The bond is allowed to condition 2 days at room temperature prior to proceeding with the aging studies which are discussed below.

Aging Studies

Room Temperature Aging

In testing the performance of an adhesive composition after aging at room temperature, bonded coupons are allowed to age for 1 to 35 days at room temperature.

Aging at Elevated Temperature

In determining the heat resistance of an adhesive composition, bonded coupons are placed in an oven maintained at 160° F. (72° C.) or 200° F. (94° C.) for 1 to 15 days.

Aging in Water

In determining the water resistance of an adhesive composition, bonded coupons are immersed in a water bath maintained at room temperature for 1 to 15 days.

Aging in a 100% Relative Humidity Environment

In determining the combined heat and humidity resistance of an adhesive composition, bonded coupons are placed in a sealable gallon jar containing about 1 inch (2.5 cm) of water. The adhesive bond is not permitted to contact the water. After sealing, the jar is placed in an oven maintained at 120° F. (49° C.) or at 160° F. (72° C.). The humidity within the sealed jar approximates 100% relative humidity. After 1 to 15 days the bonded coupons are removed from the jar. In the Examples below, relative humidity has been abbreviated "RH".

Overlap Shear Testing

After aging under one of the above-described methods, the bonded coupons are allowed to return to room temperature. Subsequently, the overlap shear value is determined using an Instron Dynamic Tester operated at a jaw separation rate of 0.1 inch (0.25 cm) per minute. The overlap shear values shown below each represent the average value of three tests.

EXAMPLE 1

Methyl 2-cyanopenta-2,4-dienoate was prepared as follows:

Zinc chloride (80 g), methyl cyanoacetate (99 g, 1.00 mole) and p-dioxane (300 ml) were placed in a 1 liter round-bottomed flask equipped with a magnetic stirrer. Acrolein (80 ml, 1.20 moles) was added dropwise to the above mixture over a period of 1.5 hours, the mixture was held at 20° C. and was constantly stirred. After an additional 3 hours, the mixture was poured into ice-cold 1.0 N HCl (2 l), and the resulting mixture was stirred for 30 minutes. A white precipitate was thereupon filtered, washed with cold water (250 ml), and dried. The precipitate was then dissolved in diethyl ether (500 ml) and dried over magnesium sulfate. After the solution was filtered, 2,6-di-tert-butyl-4-methylphenol (20 mg) and p-toluenesulfonic acid (10 mg) were added and the diethyl ether was thereafter removed under vacuum. The residue was vacuum distilled to yield 90 g (66% yield) of product having a m.p. of 40°–42° C.

A suitable composition which comprises the above methyl 2-cyanopenta-2,4-dienoate and which is in accordance with the present invention was prepared using the following ingredients which were simply combined and mixed until a uniform solution was obtained:

|  | Parts by Weight |
| --- | --- |
| "Loctite 495" (an ethyl cyanoacrylate-based adhesive, commercially available from Loctite Corporation) | 70 |
| Methyl 2-cyanopenta-2,4-dienoate | 30 |

The composition of this example was tested in accordance with the procedures described hereinabove and the results appear in Table 1 below. Results are also included for "Loctite 495" itself.

TABLE 1

|  | Aging Procedure | Overlap Shear (pounds per square inch) after | |
| --- | --- | --- | --- |
|  |  | 1 day | 15 days |
| Composition of this Example | Room Temperature | 2300 | 2800 |
|  | 160° F. | 2400 | 2100 |
|  | Water | 2000 | 1800 |
|  | 120° F./100% RH | 2100 | 1000 |
| "Loctite 495" | Room Temperature | 1400 | 1200 |
|  | 160° F. | 1100 | 800 |
|  | Water | 800 | 600 |
|  | 120° F./100% RH | 800 | 300 |

As is apparent from the above results, the composition of this example, by reason of inclusion of methyl 2-cyanopenta-2,4-dienoate therein, exhibited superior performance at both 1 day and 15 days.

EXAMPLE 2

A suitable composition in accordance with the present invention is prepared using the following ingredients which were simply combined and mixed until a uniform solution was obtained:

|  | Parts by Weight |
|---|---|
| "CA-4" (an ethyl cyanoacrylate-based adhesive, commercially available from 3M) | 70 |
| Ethyl 2-cyanopenta-2,4-dienoate (prepared in accordance with Example 1 of U.S. Pat. No. 3,316,227 (Gerber)) | 30 |

The composition of this example was tested in accordance with the procedures described hereinabove and the results appear in Table 2 below. Results are also included for "CA-4" itself.

TABLE 2

|  | Aging Procedure | Overlap Shear (pounds per square inch) after | | |
|---|---|---|---|---|
|  |  | 1 day | 15 days | 35 days |
| Composition of this Example | Room Temperature | 2400 | 2400 | 2600 |
|  | 160° F. | 2400 | 1500 |  |
|  | Water | 1700 | 1600 |  |
|  | 120° F./100% RH | 1700 | 500 |  |
| "CA-4" | Room Temperature | 2000 | 1700 | 1700 |
|  | 160° F. | 800 | 500 |  |
|  | Water | 1400 | 400 |  |
|  | 120° F./100% RH | 700 | 300 |  |

As is apparent from the above results, the composition of this example, by reason of inclusion of ethyl 2-cyanopenta-2,4-dienoate therein, exhibited superior performance at 1 day, 15 days and 35 days.

EXAMPLE 3

A suitable composition in accordance with the present invention was prepared using the following ingredients which were simply combined and mixed until a uniform solution was obtained:

|  | Parts by Weight |
|---|---|
| "Loctite 493" (a methyl cyanoacrylate-based adhesive, commercially available from Loctite Corporation) | 70 |
| Methyl 2-cyanopenta-2,4-dienoate of Example 1 | 30 |

The composition of this example was tested in accordance with the procedures described hereinabove and the results appear in Table 3 below. Results are also included for "Loctite 493" itself.

TABLE 3

|  | Aging Procedure | Overlap Shear (pounds per square inch) after | |
|---|---|---|---|
|  |  | 1 day | 15 days |
| Composition of this Example | Room Temperature | 2100 | 2300 |
|  | 160° F. | 1000 | 800 |
|  | Water | 1900 | 2000 |
|  | 120° F./100% RH | 1500 | 600 |
| "Loctite 493" | Room Temperature | 2500 | 2400 |
|  | 160° F. | 1500 | 600 |
|  | Water | 2200 | 1500 |

TABLE 3-continued

|  | Aging Procedure | Overlap Shear (pounds per square inch) after | |
|---|---|---|---|
|  |  | 1 day | 15 days |
|  | 120° F./100% RH | 1900 | 300 |

As is apparent from the above results, the composition of this example, by reason of inclusion of methyl 2-cyanopenta-2,4-dienoate therein, exhibited improved water and humidity resistance at 15 days.

EXAMPLE 4

A suitable composition in accordance with the present invention was prepared using the following ingredients which were simply combined and mixed until a uniform solution was obtained:

|  | Parts by Weight |
|---|---|
| Allyl cyanoacrylate (prepared as described in U.S. Pat. No. 3,254,111 (Hawkins et al.), incorporated herein by reference) | 70 |
| Methyl 2-cyanopenta-2,4-dienoate of Example 1 | 30 |
| Polymethyl methacrylate (commercially available under the trade designation "Elvacite 2041" from E.I. du Pont de Nemours and Company) | 4 |

The composition of this Example was tested in accordance with the procedures described hereinabove and the results appear in Table 4 below. Results are also included for a composition containing 100 parts by weight of allyl cyanoacrylate and 4 parts by weight of "Elvacite 2041".

TABLE 4

|  | Aging Procedure | Overlap Shear (pounds per square inch) after | |
|---|---|---|---|
|  |  | 1 day | 15 days |
| Composition of this Example | Room Temperature | 1600 | 2200 |
|  | 160° F. | 1900 | 1600 |
|  | Water | 1600 | 1900 |
|  | 120° F./100% RH | 1800 | 1100 |
| Allyl cyanoacrylate | Room Temperature | 1700 | 1900 |
|  | 160° F. | 2400 | 2400 |
|  | Water | 900 | 500 |
|  | 120° F./100% RH | 500 | 300 |

As is apparent from the above results, the composition of this Example, by reason of inclusion of methyl 2-cyanopenta-2,4-dienoate therein, exhibited superior performance after aging in water and after aging in an environment of 100% relative humidity.

EXAMPLE 5

A suitable composition in accordance with the present invention was prepared using the following ingredients which were simply combined and mixed until a uniform solution was obtained:

|  | Parts by Weight |
|---|---|
| "B-20" (an n-butyl cyanoacrylate based adhesive commercially available from 3M) | 70 |
| Methyl 2-cyanopenta-2,4-dienoate of Example 1 | 30 |

The composition of this Example was tested in accordance with the procedures described hereinabove and the results appear in Table 5 below. Results are also included for "B-20" itself.

TABLE 5

| | | Overlap Shear (pounds per square inch) after | |
|---|---|---|---|
| | Aging Procedure | 1 day | 15 days |
| Composition of this Example | Room Temperature | 2300 | 2700 |
| | 160° F. | 2500 | 2700 |
| | Water | 2000 | 2000 |
| | 120° F./100% RH | 1900 | 900 |
| "B-20" | Room Temperature | 1600 | 1200 |
| | 160° F. | 1600 | 800 |
| | Water | 1100 | 400 |
| | 120° F./100% RH | 1200 | 600 |

As is apparent from the above results, the composition of this Example, by reason of inclusion of methyl 2-cyanopenta-2,4-dienoate therein exhibited superior performance at both 1 day and 15 days.

EXAMPLE 6

Suitable compositions in accordance with the present invention were prepared using the following ingredients in the amounts indicated.

| | Parts by Weight Composition | | |
|---|---|---|---|
| | A | B | C |
| "CA-8" (an ethyl cyanoacrylate-based adhesive, commercially available from 3M) | 95 | 85 | 70 |
| Methyl 2-cyanopenta-2,4-dienoate of Example 1 | 5 | 15 | 30 |

In preparing the compositions of this Example, the ingredients were simply combined and mixed until a uniform solution was obtained.

The compositions of this Example were tested in accordance with the procedures described hereinabove and the results appear in Table 6 below. Results are also included for "CA-8" itself.

TABLE 6

| | | Overlap Shear (pounds per square inch) after | | |
|---|---|---|---|---|
| Composition | Aging Procedure | 1 day | 15 days | 35 days |
| A | Room Temperature | 2600 | 2500 | 2500 |
| | 160° F. | 2600 | 1800 | |
| | Water | 2100 | 1500 | |
| | 120° F./100% RH | 1700 | 900 | |
| B | Room Temperature | 2300 | 2400 | 2400 |
| | 160° F. | 2600 | 2600 | |
| | Water | 2000 | 2300 | |
| | 120° F./100% RH | 2400 | 2000 | |
| C | Room Temperature | 2400 | 2400 | 2600 |
| | 160° F. | 2600 | 2800 | |
| | Water | 2200 | 2500 | |
| | 120° F./100% RH | 2400 | 2300 | |
| "CA-8" | Room Temperature | 2500 | 2500 | 2400 |
| | 160° F. | 2600 | 2500 | |
| | Water | 1900 | 1300 | |
| | 120° F./100% RH | 1600 | 300 | |

As is apparent from the above results, inclusion of greater amounts of the methyl 2-cyanopenta-2,4-dienoate resulted in compositions exhibiting successively improved performance. Even the composition containing only 5% by weight of methyl 2-cyanopenta-2,4-dienoate exhibited improved humidity resistance as compared to "CA-8" itself.

EXAMPLE 7

Suitable compositions in accordance with the present invention were prepared using the following ingredients in the amounts indicated:

| | Parts by Weight Composition | |
|---|---|---|
| | D | E |
| "CA-8" | 80 | 75 |
| Methyl 2-cyanopenta-2,4-dienoate of Example 1 | 20 | 25 |

In preparing the compositions of this Example, the ingredients were simply combined and mixed until a uniform solution was obtained.

The compositions of this Example were tested in accordance with the procedure described hereinabove and the results appear in Table 7 below. Results are also included for "CA-8" itself.

TABLE 7

| | | Overlap Shear (pounds per square inch) after | |
|---|---|---|---|
| Composition | Aging Procedure | 7 days | 14 days |
| D | Room Temperature | 3000 | — |
| | 200° F. | 2900 | 2200 |
| | 160° F./100% RH | 700 | 300 |
| E | Room Temperature | 2900 | — |
| | 200° F. | — | 2500 |
| | 160° F./100% RH | 1700 | 1400 |
| "CA-8" | Room Temperature | 3000 | — |
| | 200° F. | 700 | 400 |
| | 160° F./100% RH | <100 | <100 |

As is apparent from the above results, the compositions of this Example, by reason of inclusion of methyl 2-cyanopenta-2,4-dienoate therein, exhibited superior performance at 7 and 14 days after aging at 200° F. and after aging in an environment of 160° F./100% Relative Humidity.

EXAMPLE 8

A suitable composition in accordance with the present invention was prepared using the following ingredients which were simply combined and mixed until a uniform solution was obtained:

| | Parts by Weight |
|---|---|
| "CA-4" | 50 |
| Methyl 2-cyanopenta-2,4-dienoate of Example 1 | 50 |

The composition of this Example exhibited an overlap shear strength of 2200 pounds per square inch after the bond was aged 2 days at room temperature. "CA-4" itself exhibited an overlap shear strength of 2300 pounds per square inch under like conditions.

EXAMPLE 9

In demonstrating the effect that the amount of the alkyl 2-cyanopenta-2,4-dienoate included in the compositions of the present invention had on the cure rate of these compositions, compositions containing "CA-4" and varying amounts of methyl 2-cyanopenta-2,4-dienoate were prepared and their set times were determined.

In determining the set time of a composition, approximately 5 milligrams of a composition was placed on a 1"×1" (2.5 cm×2.5 cm) polyvinylchloride chip. Subsequently, a second like polyvinylchloride chip was placed thereon and the two chips were held together with contact pressure. The set times (i.e., the time required to form a bond strong enough to resist separation of the polyvinylchloride chips by hand) for compositions containing 0, 15, 30, 40, 50, 60 and 70 percent methyl 2-cyanopenta-2,4-dienoate appear below in Table 8.

TABLE 8

| Percent by Weight of Methyl 2-Cyanopenta-2,4-dienoate | Set Time (sec) |
| --- | --- |
| 0 | <5 |
| 15 | <5 |
| 30 | 15 |
| 40 | 20 |
| 50 | 60 |
| 60 | 90 |
| 70 | 120 |

EXAMPLE 10

As a comparative example, the following compositions were prepared using the following ingredients:

| | Parts by Weight |
| --- | --- |
| Composition F | |
| "CA-4" | 70 |
| Methyl 2-cyanopenta-2,4-dienoate of Example 1 | 30 |
| Composition G | |
| "CA-4" | 70 |
| Allyl 2-cyanopenta-2,4-dienoate (prepared as described in U.S. Pat. No. 3,554,990 (Quinn)) | 30 |

These compositions were tested in accordance with the procedures described hereinabove and the results appear in Table 9 below. Results are also included for "CA-4" itself.

TABLE 9

| Composition | Aging Procedure | Overlap Shear (pounds per square inch) after | |
| --- | --- | --- | --- |
| | | 1 day | 15 days |
| F | Room Temperature | 2400 | 2400 |
| | 160° F. | 2800 | 2600 |
| | Water | 2200 | 2200 |
| | 120° F./100% RH | 2100 | 1100 |
| G | Room Temperature | 2200 | 2800 |
| | 160° F. | 2000 | 2100 |
| | Water | 1400 | 900 |
| | 120° F./100% RH | 900 | 400 |
| "CA-4" | Room Temperature | 2000 | 1700 |
| | 160° F. | 800 | 500 |
| | Water | 1400 | 400 |
| | 120° F./100% RH | 700 | 300 |

As is apparent from the above results, Composition F which is in accordance with the present invention generally exhibited superior performance as compared to both Composition G and "CA-4" itself.

EXAMPLE 11

As a further comparative example, a composition was prepared using the following ingredients:

| | Parts by Weight |
| --- | --- |
| Allyl cyanoacrylate | 50 |
| Allyl 2-cyanopenta-2,4-dienoate (prepared as described in U.S. Pat. No. 3,554,990 (Quinn)) | 50 |
| "Elvacite 2041" | 4 |

After curing 72 hours at room temperature, the overlap shear value (determined as described hereinabove) was only 400 pounds per square inch.

What is claimed is:

1. An adhesive composition comprising:
   (a) 100 parts by weight of an alpha-cyanoacrylate selected from the group consisting of ethyl cyanoacrylate, n-propyl cyanoacrylate, isopropyl cyanoacrylate, n-butyl cyanoacrylate and allyl cyanoacrylate; and
   (b) about 15 to 35 parts by weight of an alkyl 2-cyanopenta-2,4-dienoate selected from the group consisting of methyl 2-cyanopenta-2,4-dienoate and ethyl 2-cyanopenta-2,4-dienoate.

2. An adhesive composition according to claim 1, wherein said alkyl 2-cyanopenta-2,4-dienoate is methyl 2-cyanopenta-2,4-dienoate.

3. An adhesive composition according to claim 1, wherein said alpha-cyanoacrylate is selected from the group consisting of ethyl cyanoacrylate and allyl cyanoacrylate.

4. An adhesive composition according to claim 1, wherein said alkyl 2-cyanopenta-2,4-dienoate is methyl 2-cyanopenta-2,4-dienoate and said alpha-cyanoacrylate is selected from the group consisting of ethyl cyanoacrylate and allyl cyanoacrylate.

* * * * *

UNITED STATES PATENT AND TRADEMARK OFFICE
CERTIFICATE OF CORRECTION

PATENT NO. : 4,425,471

DATED : January 10, 1984

INVENTOR(S) : George H. Millet

It is certified that error appears in the above-identified patent and that said Letters Patent is hereby corrected as shown below:

Col. 1, line 37, "3,554,900" should read --3,554,990--.

Col. 3, line 39, delete "15".

Signed and Sealed this

Twenty-ninth Day of May 1984

[SEAL]

Attest:

GERALD J. MOSSINGHOFF

Attesting Officer    Commissioner of Patents and Trademarks